US008266279B2

(12) United States Patent
Marvasti

(10) Patent No.: US 8,266,279 B2
(45) Date of Patent: Sep. 11, 2012

(54) SYSTEM AND METHOD FOR GENERATING AND USING FINGERPRINTS FOR INTEGRITY MANAGEMENT

(75) Inventor: Mazda A. Marvasti, Rancho Santa Margarita, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 12/693,358

(22) Filed: Jan. 25, 2010

(65) Prior Publication Data

US 2010/0131645 A1 May 27, 2010

Related U.S. Application Data

(62) Division of application No. 11/535,787, filed on Sep. 27, 2006, now Pat. No. 7,707,285.

(51) Int. Cl.
*G06F 15/173* (2006.01)
(52) U.S. Cl. .......... 709/224; 709/200; 709/223; 714/38; 714/39; 702/179; 702/186; 702/187
(58) Field of Classification Search .................. 709/224, 709/223; 714/38, 39; 702/179, 186, 187
See application file for complete search history.

(56) References Cited

U.S. PATENT DOCUMENTS

| 4,769,761 | A | 9/1988 | Downes et al. |
|---|---|---|---|
| 5,067,099 | A | 11/1991 | McCown et al. |
| 5,297,150 | A | 3/1994 | Clark |
| 5,835,902 | A | 11/1998 | Jannarone |
| 6,049,792 | A | 4/2000 | Hart et al. |
| 6,216,119 | B1 | 4/2001 | Jannarone |
| 6,289,330 | B1 | 9/2001 | Jannarone |
| 6,327,677 | B1 | 12/2001 | Garg et al. |
| 6,336,065 | B1 | 1/2002 | Gibson et al. |
| 6,453,346 | B1 | 9/2002 | Garg et al. |
| 6,591,255 | B1 | 7/2003 | Tatum et al. |
| 6,609,083 | B2 | 8/2003 | Enck et al. |
| 6,622,264 | B1 | 9/2003 | Bliley et al. |
| 6,647,377 | B2 | 11/2003 | Jannarone |
| 6,738,811 | B1 * | 5/2004 | Liang ............................ 709/224 |
| 7,050,936 | B2 | 5/2006 | Levy et al. |
| 7,080,141 | B1 * | 7/2006 | Baekelmans et al. ......... 709/224 |
| 7,107,339 | B1 | 9/2006 | Wolters |
| 7,124,328 | B2 | 10/2006 | Bowers et al. |
| 7,286,962 | B2 | 10/2007 | Di Palma et al. |
| 7,451,210 | B2 * | 11/2008 | Gupta et al. ................... 709/224 |
| 7,483,970 | B2 * | 1/2009 | Anuszczyk et al. ........... 709/224 |
| 7,509,415 | B2 * | 3/2009 | Baekelmans et al. ......... 709/224 |
| 7,519,624 | B2 | 4/2009 | Korupolu et al. |
| 7,783,744 | B2 * | 8/2010 | Garg et al. ..................... 709/224 |
| 2002/0040280 | A1 * | 4/2002 | Morgan ........................ 702/114 |

(Continued)

*Primary Examiner* — John Follansbee
*Assistant Examiner* — Anthony Mejia

(57) ABSTRACT

A system and method is provided for capturing and using problem fingerprints in an Information Technology (IT) infrastructure for integrity management. A fingerprint of the transaction topology in an IT infrastructure is automatically captured at various time intervals prior to the occurrence of an event leading to a problem, such as a failure, hard threshold violation, defined transaction violation or user-provided occurrence. The fingerprint provides an indication of the activity and operation of the IT infrastructure immediately preceding the problem event. The captured fingerprint is then used to monitor real-time data in the IT infrastructure operation and activity to look for activity that matches a captured fingerprint to provide an indication of a pending problems before the problems occur. When it is determined that there is sufficient probability a problem event will occur based upon real-time data matching a previously generated problem fingerprint, an alert is generated to provide sufficient notification prior to the occurrence of problem event.

18 Claims, 6 Drawing Sheets

U.S. PATENT DOCUMENTS

| | | |
|---|---|---|
| 2002/0083168 A1 | 6/2002 | Sweeney et al. |
| 2002/0183971 A1 | 12/2002 | Wegerich et al. |
| 2003/0204789 A1 | 10/2003 | Peebles et al. |
| 2004/0068199 A1 | 4/2004 | Echauz et al. |
| 2004/0078171 A1 | 4/2004 | Wegerich et al. |
| 2004/0078695 A1 | 4/2004 | Bowers et al. |
| 2004/0123285 A1 | 6/2004 | Berg et al. |
| 2006/0106743 A1 | 5/2006 | Horvitz |
| 2006/0116981 A1 | 6/2006 | Krimmel et al. |
| 2006/0129606 A1 | 6/2006 | Horvitz et al. |
| 2006/0282471 A1 | 12/2006 | Mark et al. |
| 2007/0005761 A1 | 1/2007 | Wolters |
| 2009/0125758 A1* | 5/2009 | Anuszczyk et al. ............ 714/48 |

* cited by examiner

|  | $P_1 - C_{13}$ | $P_2 - C_{32}$ | $P_3 - C_{12}$ | $P_4 - C_{41}$ |
|---|---|---|---|---|
| $S_1 - C_{11}$ | 0 | .1 | 0 | 0 |
| $S_1 - C_{32}$ | .3 | .2 | 0 | .3 |
| $S_2 - C_{22}$ | .5 | 0 | .1 | 0 |
| $S_3 - C_{13}$ | 0 | 0 | .6 | 0 |
| $S_3 - C_{22}$ | 0 | .8 | 0 | .4 |
| $S_4 - C_{11}$ | 0 | 0 | 0 | .3 |
| $S_4 - C_{21}$ | .2 | .2 | .4 | 0 |
| $S_5 - C_{31}$ | 0 | 0 | 1 | 0 |
| $S_6 - C_{51}$ | 0 | 0 | 0 | .1 |

SYSTEM AND METHOD FOR GENERATING AND USING FINGERPRINTS FOR INTEGRITY MANAGEMENT

RELATED APPLICATIONS

This application is a divisional of and claims the priority of U.S. Utility application Ser. No. 11/535,787, filed on Sep. 27, 2006, issued as U.S. Pat. No. 7,707,285, the contents of which are incorporated by reference herein.

TECHNICAL FIELD

This disclosure relates generally to the field of network monitoring systems and, more particularly, to a system and method for providing integrity management in a network environment by generating and using problem fingerprints.

BACKGROUND

A network consists of two or more computers or other devices that are linked in order to share resources (such as databases, servers, printers, etc.), exchange files, or allow electronic communications. The computers on a network may be linked together through a communication medium, such as cables, telephone lines, radio waves, satellites, or infrared light beams. There are many types of computer networks, including local-area networks (LANs), wide-area networks (WANs), campus-area networks (CANs), metropolitan-area networks (MANs) and home-area networks (HANs). Networks are used to communicate between devices, such as via e-mail, and to provide access to resources stored on another device, such as a server.

Most organizations possess an Information Technology (IT) infrastructure comprising the computerized networks, intelligent terminals, and accompanying applications and services people use to access, create, disseminate, and utilize digital information. The IT infrastructure also includes the equipment, software, services, and products used in storing, processing, transmitting, and displaying all forms of information. Organizations are increasingly dependent on their IT infrastructure for all of their essential business processes, which often depend on software, hardware, networks and data systems working together with full integrity to provide business functionality to external and internal users alike. Increasingly, "online" business processes are both critical to a company's well-being and based on distributed IT infrastructures of mounting complexity. The scope of this infrastructure might even extend beyond the organization's boundaries into the infrastructures of partners and providers of managed services.

IT infrastructures are typically not the centralized, well-understood operations characteristic of the days of mainframes, architected and tested as a whole down to the last possible race condition or anomaly. Instead, IT professionals must manage an application infrastructure that is a complex maze of loosely interconnected racks of servers, network components, and a multi-tiered stack of logical components including application servers, database servers, load balancers and the applications themselves. Each business process depends on a chain of components drawn from that maze, yet the components are only managed as one of a number of similar components in a rack, "farm," or other logical silo. The result is "affordable" computing power, but at the cost of difficult-to-manage (and thus costly) system behavior.

Network management is the process of managing the various network devices and network communication links in the IT infrastructure to provide the necessary network services to the users of the network. Typical network management systems collect information regarding the operation and performance of the network and analyze the collected information to detect problems in the network. Many companies have invested in tools that do a good job of helping technical experts monitor and manage each element or silo in the multi-tiered stack of physical and logical systems. But element monitoring falls short, because when something goes wrong in the dynamically interdependent overall system, there exists no manner of knowing which physical or logical component in which rack might be the cause. In fact, there typically is not a single cause, but rather some interaction of components that really creates the problem.

Element monitoring tools are currently used to attempt to identify problems occurring in the IT infrastructure. However, the element monitoring tools in wide use in enterprises today lack a holistic view and understanding of the interdependencies of the interconnected elements of the entire IT infrastructure. There is a need to develop a system and method for managing the operating integrity of business technology systems with a comprehensive understanding of the interdependencies among all of the system components in an IT infrastructure by analyzing the end-to-end metrics and events to pinpoint the problem elements in a transaction chain.

SUMMARY

According to a feature of the disclosure, a system and method is provided for capturing and using problem fingerprints in an Information Technology (IT) infrastructure for integrity management. In one aspect, a comprehensive understanding of the interdependencies among all of the system components in an IT infrastructure is provided by analyzing the end-to-end metrics for events to pinpoint the problem elements in a transaction chain. In another aspect, the present system and method automatically captures a fingerprint of the transaction topology in an IT infrastructure at various time intervals prior to the occurrence of an event leading to a problem, such that the fingerprint provides an indication of the activity and operation of the IT infrastructure immediately preceding the problem event. The event triggering the capture of the fingerprint may be based on failures, hard threshold violations, defined transactions such as transaction slow-downs in the IT infrastructure, or user-provided occurrences.

In another aspect, the fingerprint is weighted and used to monitor IT infrastructure operation and activity to provide an indication of potential problems before the problems occur by matching real-time data on the IT infrastructure against the fingerprint to determine when the operation and activity on the IT infrastructure appears similar to activity that previously resulted in a problem event. When it is determined that there is sufficient probability that a problem event will occur based upon the real-time data matching a previously generated problem fingerprint, an alert is generated to provide sufficient notification prior to the occurrence of problem event. Based upon the comprehensive understanding of the interdependencies among all of the system components, the alert that is generated is able to specifically identify the root cause and location of the pending problem so that the alert can be delivered to a target audience. The captured problem fingerprint is device independent so that it can be applied to other transactions and devices in the IT infrastructure.

For purposes of summarizing the disclosure and the advantages achieved over the prior art, certain advantages of the disclosure have been described herein. Of course, it is to be understood that not necessarily all such advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other advantages as may be taught or suggested herein.

All of these embodiments are intended to be within the scope of the disclosure herein disclosed. These and other embodiments of the present disclosure will become readily apparent to those skilled in the art from the following detailed description of the preferred embodiments having reference to the attached figures, the disclosure not being limited to any particular preferred embodiment disclosed.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

The present disclosure teaches a novel system and method for generating and using problem fingerprints in an Information Technology (IT) infrastructure for integrity management. Fingerprints are developed using a comprehensive understanding of the interdependencies among all of the system components in an IT infrastructure by analyzing the end-to-end metrics and events to pinpoint the problem elements in a transaction chain. In one aspect, the present system and method automatically captures a fingerprint of the transaction topology in an IT infrastructure at various time intervals prior to the occurrence of an event leading to a problem, such that the fingerprint provides an indication of the activity and operation of the IT infrastructure immediately preceding the problem event. The event triggering the capture of the fingerprint may be based on failures, hard threshold violations, defined transactions such as transaction slowdowns in the IT infrastructure, or user-provided occurrences.

For the purposes of this disclosure, the following terms shall be understood to possess the following meaning associated therewith:

Event: a condition that indicates an abnormal behavior in a device or a transaction (Event=Symptom+device+generation time+other information).

Symptom: the actual metric and the reason an event was generated not associated with a device or transaction (Symptom=Metric+Event Reason).

Metric: the atomic being measured on a device or a transaction, where an atomic may include any fundamental entity within a system which can be measured. A metric can consist of multiple sub items (e.g. Metric=Name+Type+SubType).

Rule: a single element describing the probability of a symptom (occurring for a given tier group and subgroup) for a specific time cut. (Rule=Time Cut+Symptom+Tier Group+Tier Subgroup+Weight).

Fingerprint: a set of rules associated with a specific tier group, tier subgroup and transaction.

Transaction: a grouping of devices within a hierarchical model consisting of tier groups and subgroups. Each device will belong to a particular tier group and tier subgroup.

Tier Group: a column within a transaction hierarchy which has a unique label (identified by the user) that separates the functionality performed by the devices within that tier group from other tier groups.

Tier Subgroup: a sub-categorization of a tier group into multiple subgroups, where the devices within a tier group can be sub-categorized based on specific functionality performed by those devices.

Alert: an event that has gone through the fingerprint process and has been identified as necessitating notification of a potential problem.

Time Cut: an integer number indicating the number of time units prior to the occurrence of a problem (the problem occurs at time cut 0). The unit time is determined by a predetermined time unit (e.g., minutes) per time cut user input.

Fingerprint Generation

Figure 1:
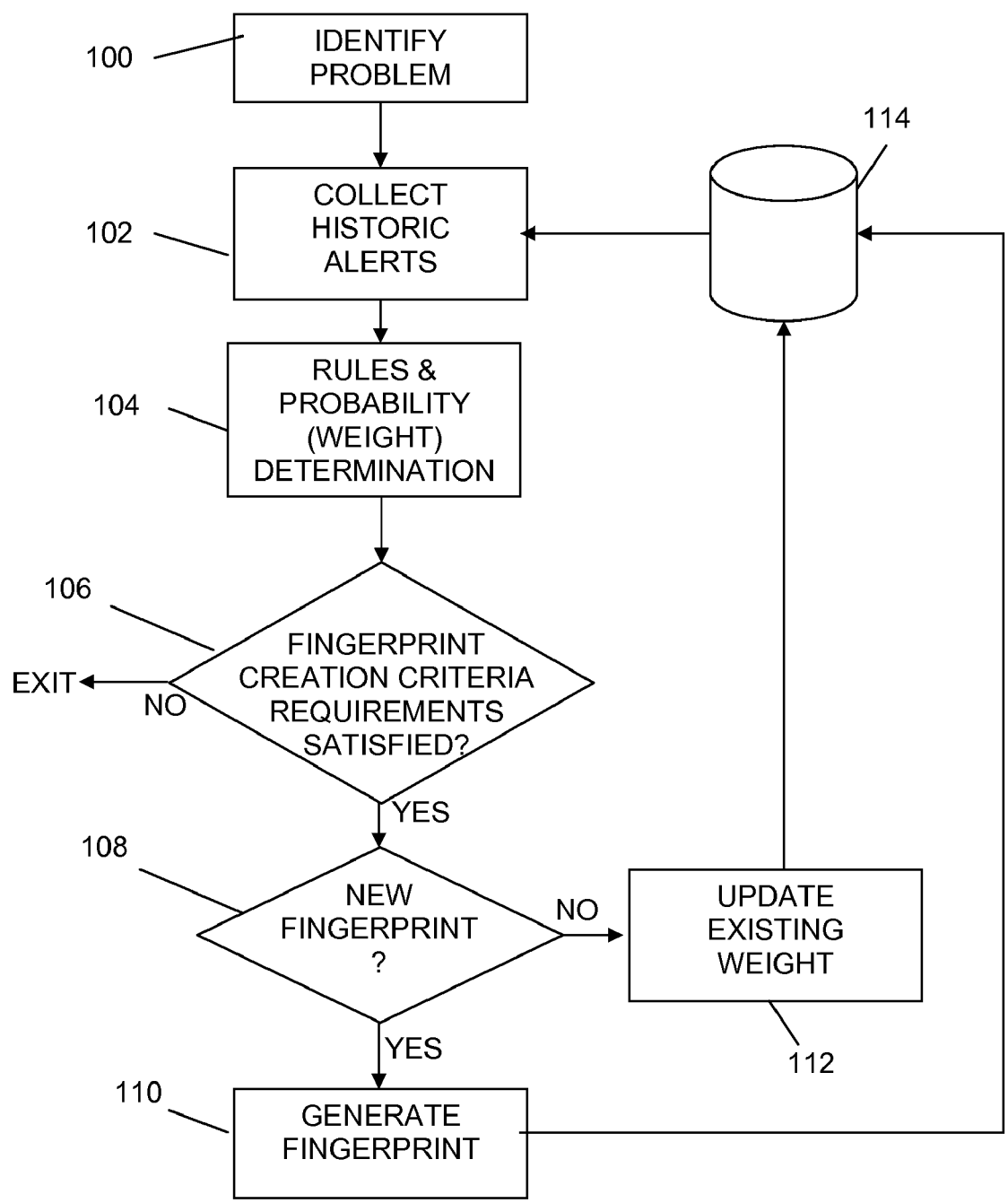
FIG. 1 is a flow diagram of a method for generating fingerprints in accordance with one embodiment of the present disclosure.

Referring now to FIG. 1, an operational flow diagram for one embodiment of a method of capturing a fingerprint of a problem in information technology (IT) infrastructure is illustrated. Initially, a problem in the IT infrastructure is identified in operation 100. In one aspect, the problem is identified by identifying at least one of a failure, a hard threshold violation, a defined transaction or a user-identified occurrence in at least one device and/or transaction in the IT infrastructure. In a further aspect, the defined transaction identifying the problem may be a function of a dynamic thresholding calculation that is performed on a metric in the IT infrastructure. One such method of performing dynamic thresholding calculations is described in U.S. patent application entitled, "Self-Learning Integrity Management System and Related Methods," filed on even date herewith and assigned to the same assignee as the present application, the contents of which are hereby incorporated by reference in its entirety. By way of example, one such dynamic thresholding determination may include a determination of a transaction slowdown on the IT infrastructure.

Figure 2:
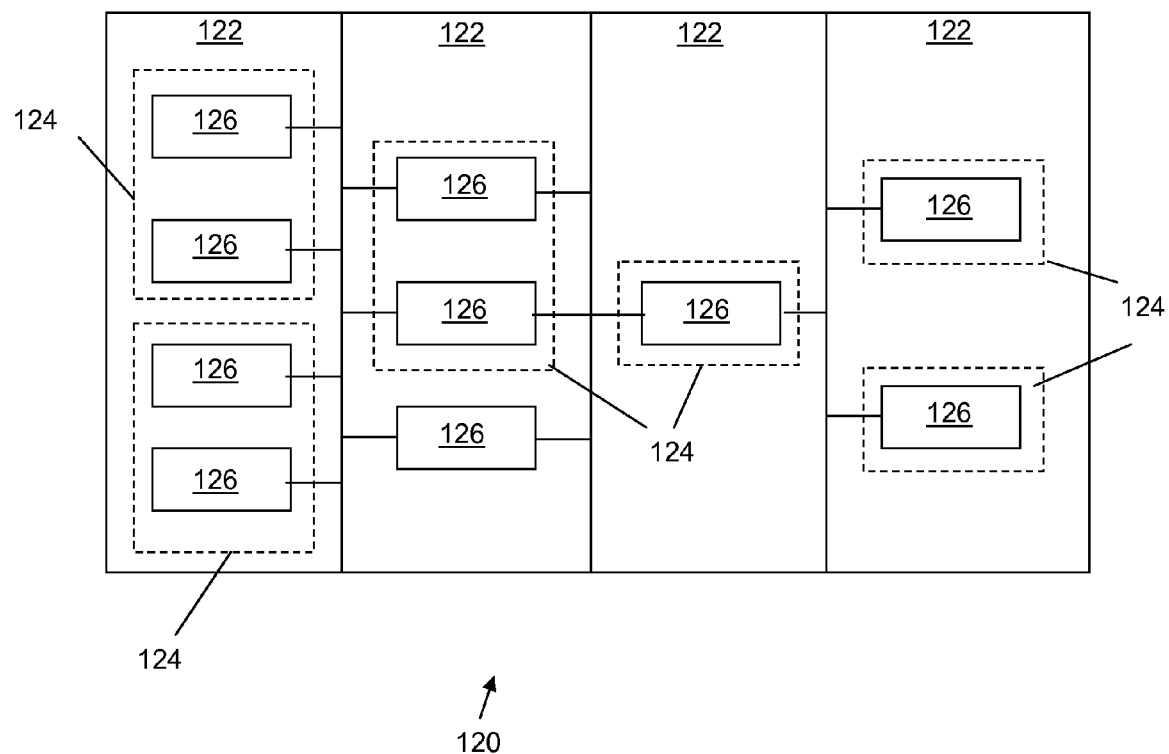
FIG. 2 is a representative transaction topology in accordance with one embodiment of the present disclosure.

After a problem has been identified, information related to the problem is collected in operation 102. In one aspect, the collected information includes identifying the device(s) in the IT infrastructure where the problem is originating, where a group of devices in a transaction topology in the IT infrastructure that includes the identified problem device is also determined. Referring to the illustration of one embodiment of a transaction topology shown in FIG. 2, a transaction topology 120 of a multi-tier transaction may include a plurality of tier groups 122 that are respectively defined by the functions performed by the devices 126 in that tier group 122. For example, the different tier groups 122 could respectively identify an application server, a database server, an email server, a Citrix presentation server, etc. Each tier group 122 is preferably unique when identifying the transaction topology. A tier group may include at least one tier subgroup 124 that is a sub-grouping of devices 126 in a tier group 122. As will be described herein below, when a fingerprint match is made and a problem is predicted to occur in the IT infrastructure, the identification of the location where the problem will be occurring preferably identifies the particular tier group 122 and the tier subgroup 124 in order to pinpoint the problem.

Further information collected in operation 102 will include how far back in time the system and method should look when analyzing the activity of the IT infrastructure that led up to the occurrence of the problem by determining a number of time cuts for which to obtain information and a time interval for such time cuts. All transactions within the group of devices that involve the problem device are also identified and, for a given time cut, a set of all events for the identified transactions are collected.

With reference back to FIG. 1, once the information related to the problem has been collected, a set of rules are created for the problem in operation 104. Probabilities or weights are determined and assigned to each of the rules, as will be described in greater detail below, such that a rule describes the probability of a symptom occurring for a given group of devices will indicate a problem fingerprint for a given time cut. The collective set of rules that are created for a given problem will represent the fingerprint for such problem. A determination is made in operation 106 if the number of rules in the collected set of rules meets a certain threshold number of rules that are required to be satisfied to satisfy the fingerprint creation criteria. If the number of rules falls below the certain threshold, then it is determined that not enough data exists to generate a fingerprint and the fingerprint generation process is exited. If the number of rules describing the fingerprint meets the threshold number, then it is determined that there is enough information to create a viable fingerprint for the problem. It is then determined in operation 108 whether the fingerprint is new or whether a fingerprint already exists for the given transaction and group of devices. If the fingerprint is new, a new fingerprint is generated by operation no and then stored in a system database 114. If the fingerprint is already in existence, then the weights in the existing fingerprint are updated with the values in the newly generated fingerprint in operation 112, where the updated fingerprint is then stored in database 114.

In one aspect, the fingerprint generation process can be represented mathematically according to following equations.

$$R_{ji} = \text{Symptom} + \text{Tier Group} + \text{Tier Subgroup} + \text{Weight},$$
for the $j$-th rule and the $i$-th Time Cut, $$N_R(tc_i) = \text{the total number of rules for time cut } i, \text{ and}$$

$$C_{ij} = \text{the } j\text{-th subgroup in } i\text{-th tier group,}$$

for a rule R, a number of rules N, and a tier group and tier subgroup C.

In one embodiment, the input to the system and method for capturing the fingerprints may include:
a. The device where the problem is originating ($d_o$)
b. The tier group and subgroup of problem origination ($C_{lm}$)
c. The time interval in time cuts ($tc_i$)
d. Number of time cuts ($t_N$)
e. Problem start time (tp)

All transactions containing the problem device $d_o$ are obtained within the tier group and subgroup of problem origination ($C_{lm}$), where this set of transactions is referred to as $T_{do}$. For the i-th time cut, the system and method obtains the set of all events, calculates the corresponding weights and constructs the set of rules $R_{ji}$ for the problem. If the number of rules $N_R(tc_i)$ describing the fingerprint is equal to or above some specified number $N_R$, then there is a viable fingerprint $F_P$, which will be unique for a given transaction $T_K$ and tier group and subgroup of problem origination $C_{lm}$, which can be represented by the following equation:

$$F_P = \left[ |R_{ji}|_{j=0}^{N_R(tc_i)}, tc_i, tp, C_{lm}, T_k \in T_{d_0} \right]_{i=0}^{t_N - 1}$$

Rule Weight Determination

When probability weights are assigned to each rule, the assignment of weights to rules will take into account several variables. In one aspect, these variables include the particular time cut in which the symptom observed, whether the rule is a new rule or existing rule, whether the probability assigned is high enough to accept the rule, what fraction of devices within the tier group and subgroup contain the symptom, etc.

In one aspect, a rule weight (W) can be represented by the equation:

$$W = (W^{base})(\gamma)\left(\frac{N_S}{N_D}\right)(R_W^{tc_i})$$

where,
$W^{base}$ = Base weight factor for new rules, where $0 < W^{base} < 1$.
$R_W$ = Reduction factor for existing fingerprint rules that are not repeated when a fingerprint is recaptured, where $0 < R_W < 1$.
$W^{min}$ = Minimum weight allowed for a rule, where a rule is removed from the fingerprint if the rule weight falls below this level, further where $0 < W^{min} < 1$.
$\gamma$ = factor to correct for whether the symptom is from the tier group-subgroup (Cij) of where the problem is coming from, where $$\gamma = \begin{cases} \alpha & C_{ij} = C_{lm} \\ \beta & C_{ij} \neq C_{lm} \end{cases} \quad \alpha > \beta \quad 0 < \alpha, \beta < 1$$

$N_D$ = number of devices within a specified tier group.
$N_S$ = number of devices exhibiting symptom S within a specified tier group.
$tc_i$ = number of the time cut.

As can be seen from the equations, as the time cut $tc_i$ increases (noting that the time domain is moving further away from the problem origination time), there is a reduction in weight probability.

For existing fingerprints, if a newly obtained rule exists within the fingerprint for the specified time cut $tc_i$, then the weight (W) for that rule is increased in the fingerprint. For example, the weight can be increased according to the following equation:

$$W = \frac{a + bW}{a + b}$$

which will linearly scale W towards a maximum value of 1.0

If at the specified time cut $tc_i$, an existing rule in the fingerprint is not part of the newly generated rules, then the probability of the existing rule is reduced. For example, the weight can be reduced according to the following equation:

$$W = W \cdot R_W$$

Any rule having a weight (W) that is reduced that falls below the minimum rule weight $W_{min}$ is eliminated from that fingerprint for the specified time cut $tc_i$.

Fingerprint Matching

In another aspect, a fingerprint matching process is implemented in which a fingerprint is used to monitor IT infrastructure operation and activity to provide an indication of a pending problem before the problem occurs by matching real-time data on the IT infrastructure against the problem fingerprint to determine when the operation and activity on the IT infrastructure appears similar to activity that previously resulted in a problem event. The fingerprint may be generated from the above-described fingerprint generation process or may otherwise be input by another source into the fingerprint matching process. When it is determined that there is sufficient probability a problem event will occur based upon the real-time data matching a previously generated problem fingerprint, an alert is generated to provide sufficient notification prior to the occurrence of problem event. Based upon the comprehensive understanding of the interdependencies among all of the system components, the alert that is generated is able to specifically identify the root cause and location of the pending problem down to the tier group and subgroup so that a targeted alert can reach the relevant audience. This provides a substantial improvement over prior "blanket" alerts that would be provided to a network supervisor whenever any type of error occurred in a system, leaving the network supervisor to figure out the cause and location of the error.

Figure 3:
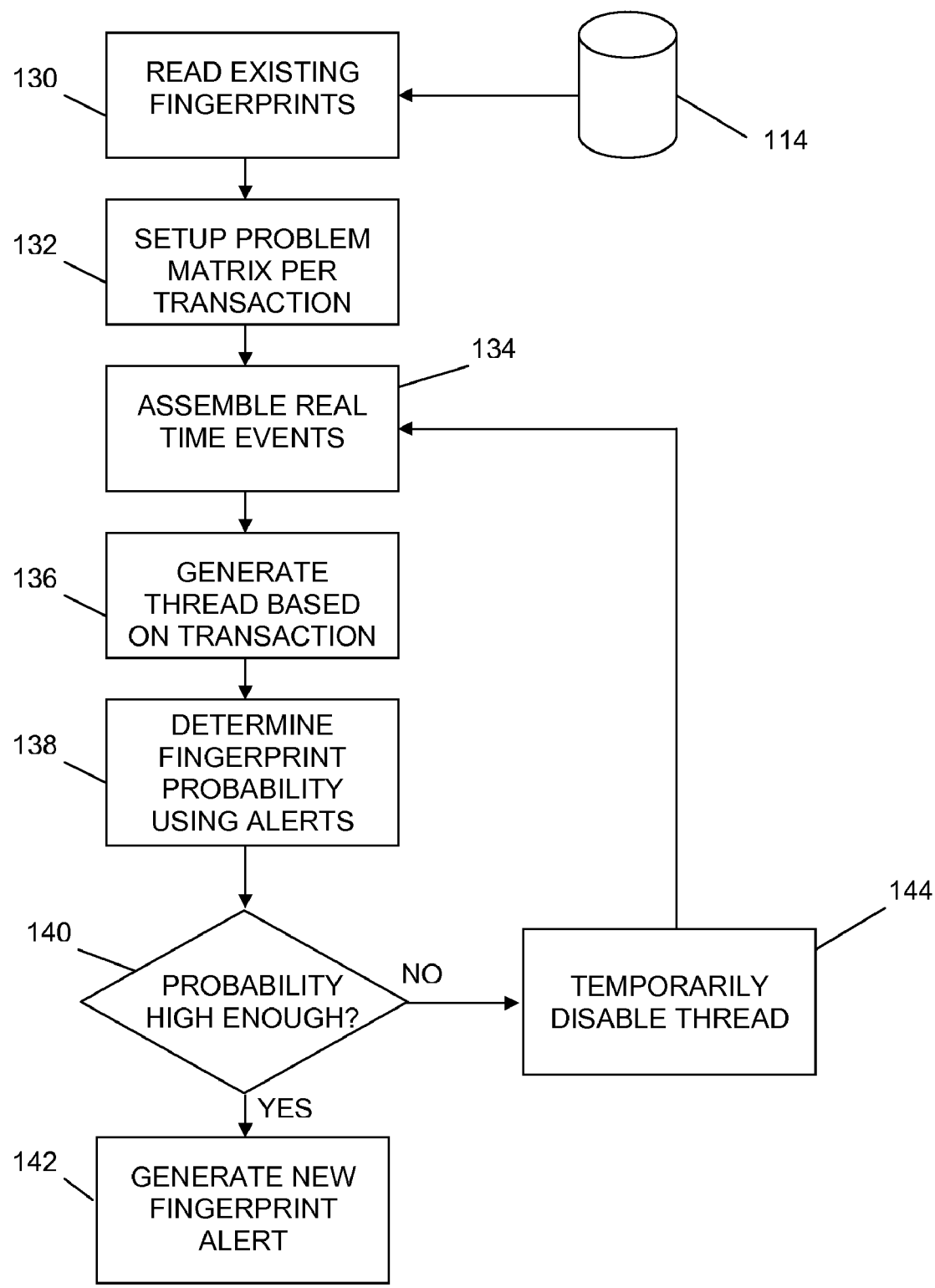
FIG. 3 is a flow diagram of a method for matching fingerprints in accordance with one embodiment of the present disclosure.

A fingerprint represents a stateless, device independent and metric-less entity that can be applied back to the relevant transaction to predict pending problems in real-time before such problems occur. This process will be referred to herein as fingerprint matching and one embodiment of which is illustrated in the operation flow diagram of FIG. 3.

Initially, the existing fingerprints are read out of the database 114 in operation 130 to obtain a set of all fingerprints (F) that apply to a transaction (T) and tier group and subgroup $C_{ij}$. For every transaction, a symptom-problem matrix is created in operation 132, wherein this matrix will be referred to hereinafter as the problem matrix. The problem matrix is created by obtaining the set of all rules from the definition of the fingerprint f∈F for a given time cut $tc_i$. Each set of rules for each fingerprint f will populate a portion of the problem matrix, such that entire problem matrix is populated in this manner for the entire set of all fingerprints (F) that apply to a transaction T and tier group and subgroup $C_{ij}$. After the problem matrix has been completed for the entire set of all fingerprints (F), the problem matrix is normalized by ensuring that for problems for which symptom-tier group information does not exist a weight of zero is assigned, thus ensuring a N×M matrix.

Figures 4A, 4B:
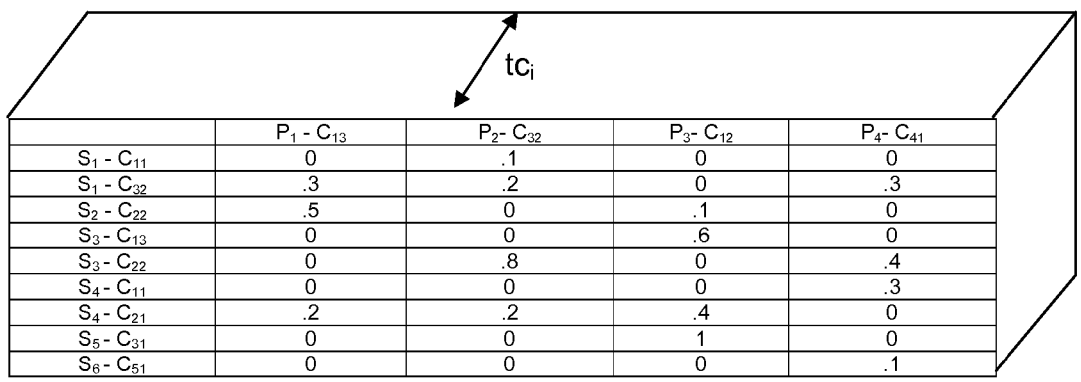
FIGS. 4A-4B illustrate representative problem matrices in accordance with one embodiment of the present disclosure.

By way of example, the problem matrix may appear as the two dimensional matrix illustrated in FIG. 4A for a specific time cut $tc_i$. The top row contains the headers for the respective columns of the problem matrix, where $P_k$-$C_{ij}$ indicates k-th problem for i-th tier group and j-th tier subgroup. The first column contains the headers for the respective rows of the problem matrix, where $S_m$-$C_{ij}$ indicates the m-th symptom for i-th tier group and j-th tier subgroup. This matrix for a specific time cut is two dimensional, such that the complete problem matrix taken across every time cut is a three dimensional matrix, as illustrated in FIG. 4B. The three dimensional problem matrix M (P, S, $tc_i$) can be designed as a function of the problem column P, the symptom row S and the time cuts $tc_i$.

With reference back to FIG. 3, once the problem matrix is obtained, the fingerprint matching process assembles real time events in operation 134 that involve the devices that are identified in the rules in the problem matrix.

Once the problem matrix M (P, S, $tc_i$) is obtained, it is used in one embodiment to identify the most probable problem (i.e., fingerprint) with respect to the incoming event stream. In this embodiment, the procedure for identifying a problem from the incoming events is described by the following operations. When an event is detected for a device $d_o$, the set of all transactions $T_{do}$ involving this device are obtained along with the set of all devices D that are part of all transactions $T_{do}$. A separate thread is generated by operation 136 to observe at least a portion of the events for the set of devices D. At predetermined intervals, the thread is activated to determine fingerprint probability in operation 138 by comparing a new set of events against the problem matrix. A determination is made by operation 140 whether the probability that the symptom-tier group information indicates the specified problem by determining whether the probability meets a certain threshold, where the threshold is either determined or selected to provide a cutoff point for only those problems with a high enough probability indication of a pending problem to merit alerting a user of the pending problem. If the probability does not meet the threshold, then the thread is temporarily disabled for a period of time by operation 144 until the process returns to operation 134 to begin assembling monitoring real time events again at some later point in time. If the probability exceeds the threshold, then a problem fingerprint matching alert is generated by operation 142. This alert can serve many purposes, including but not limited to notifying a user of the pending problem along with an indication of location (tier group and subgroup) where the problem occur and at what time the problem will likely occur. The alert may also be used to institute some degree of corrective measures to prevent the problem from ever occurring.

In one embodiment, the real-time probability determination is made using the problem matrix by comparing it against the new set of events in the generated thread. For a given transaction T∈$T_{do}$, the set of all devices $D_T$⊆D in T is obtained, and for d∈$D_T$, the set $E_d$ of all events corresponding to device d are obtained. For every $C_{ij}$ in T, the total number of devices $n_{ij}$ is obtained in addition to the number of devices $m_{ij}$ exhibiting the symptoms $S_k$. A 1×M matrix column N(S) is then constructed consisting of the values $n_{ij}/n_{ij}$ illustrating the fraction of devices exhibiting particular symptoms. For example, the 1×M matrix column could appear similar to the following:

| | |
|---|---|
| $S_1$-$C_{11}$ | 1.0 |
| $S_1$-$C_{32}$ | 0 |
| $S_2$-$C_{22}$ | 0.5 |
| $S_3$-$C_{13}$ | 0.42 |
| $S_3$-$C_{22}$ | 1.0 |

| | |
|---|---|
| $S_4$-$C_{11}$ | 0 |
| $S_4$-$C_{21}$ | 0.1 |
| $S_5$-$C_{31}$ | 0 |
| $S_6$-$C_{51}$ | 0 |

The columns in the above matrix correspond to respective columns in the problem matrix of the transaction. Any symptom-tier information combination outside of this matrix is irrelevant as it does not indicate any known problems. Every column in the transaction matrix (representing one problem) is multiplied by the above 1×M column matrix N(S). It should be noted that this is not a matrix multiplication operation; but rather a straight element to element multiplication operation. This operation is performed for every column of the matrix for all Time Cuts $tc_i$.

$$H(P,S,tc_i) = M(P,S,tc_i) \times N(S)$$

The maximum fractional difference between the columns of the H matrix and the M matrix is then computed:

$$f_r(P, tc_i) = \frac{\sum_{\forall S} H(P, S, tc_i)}{\sum_{\forall S} M(P, S, tc_i)}$$

The fractional difference then needs to be scaled with respect to the total weights of the symptoms, time cut, and the number of available symptoms for the specified problem:

$$f_{total}(P, tc_i) = (f_r(P, tc_i) f_w(W_T) - f_t(tc_i)) f_s(tc_i) + c$$

Where:

$$W_T = \sum_{\forall S} M(P, S, tc_i)$$

The equation representing the calculation of $f_{total}$ includes several correction factors that need to be applied to $f_r(P, tc_i)$ to obtain the true probability for the fingerprint. The correction function $f_w(W_T)$ compensates for the lack of high weight rules. If there are a series of low weight rules that make up the fingerprint then $f_r(P, tc_i)$ needs to be lowered to compensate for that fact. The correction function $f_t(tc_i)$ sets a minimum threshold for probability at any time cut. Thus, as the Time Cut is increased, the total probability is reduced since the further out in time from the problem the lower the probability of those events indicate a fingerprint. The correction function $f_s(tc_i)$ is the scaling factor for the number of symptoms indicating a fingerprint. This provides a check for high probability columns that have very few symptoms. The higher the number of symptoms, the more probable that the symptoms accurately represent the problem. Thus, if very few symptoms exist, then the probability is scaled down due to the low probability that the problem can be indicated by these few symptoms. The constant c ensures that the total probability ranges between zero and one.

For problem P, the largest value for $f_{Total}(P, tc_i)$ is selected:

$$f_{Total}(P) = \text{Max}\{f_{Total}(P, tc_i)\}$$

If $f_{Total}(P) > f_{min}$, then P is a potential problem, where $f_{min}$ is the minimum threshold probability that is chosen as a cutoff point for problems with a high enough probability to be sent to the user as an alert. The above described procedures are repeated for all transactions in $T_{do}$.

Correction Function $f_w(W_T)$

Figure 5A:
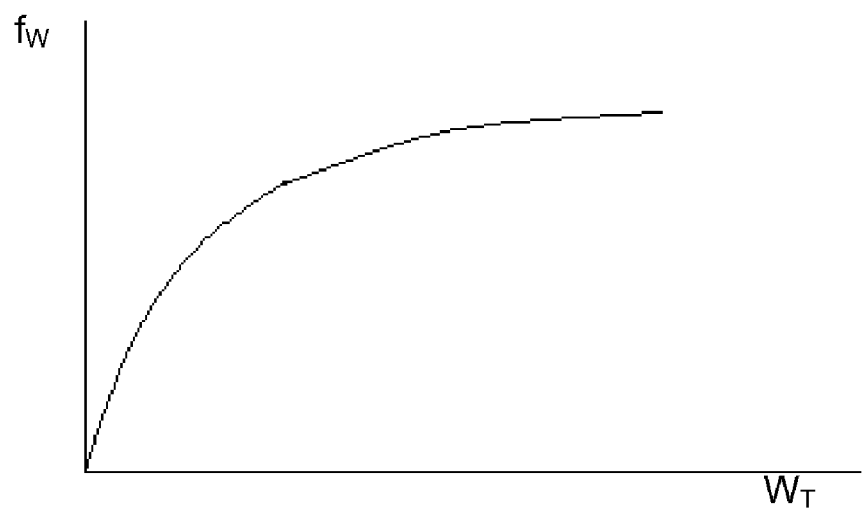
FIGS. 5A-5B are representative graphical illustrations of certain correction functions in accordance with one embodiment of the present disclosure.

The basic form of the correction function $f_w(W_T)$ can comprise any number of defined functional forms are determined proper. In one embodiment, the desired functional form may appear as illustrated in FIG. 5A which is represented by the equation:

$$f_w(W_T) = a \times W_T^2 + b \times W_T + c$$

where the following boundary conditions are imposed:

$$f_w(0) = 0$$
$$f_w(W_T \geq W_C) = 1$$
$$\frac{df_w(W_T)}{dW_T}(W_T = W_C) = 0$$

Where $W_C$ is a pre-specified specified value after which point the correction function becomes 1. Applying the boundary conditions obtains the following functional form for $f_w(W_T)$:

$$f_w(W_T) = \frac{W_T^2}{W_C^2}\left(\frac{2W_C}{W_T} - 1\right) \quad W_T \leq W_C$$
$$f_w(W_T) = 1 \quad \text{otherwise}$$

Correction Function $f_t(tc_i)$

Figure 5B:
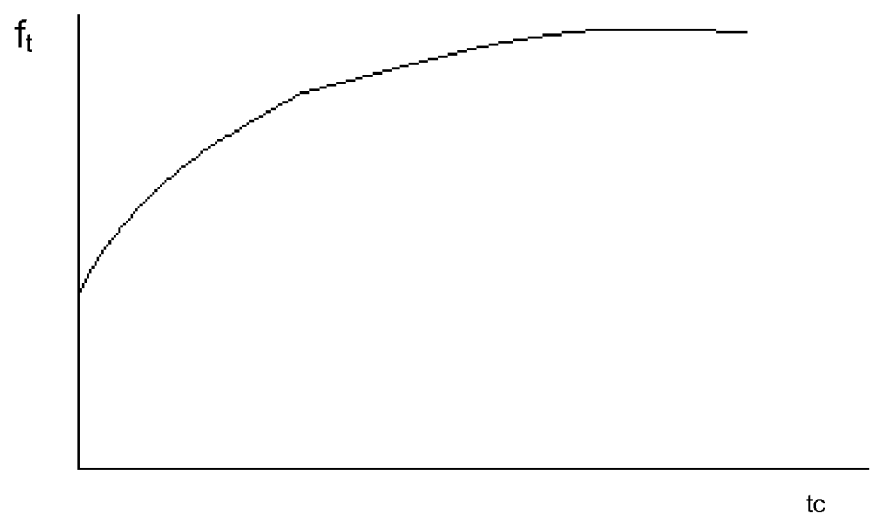

The basic form of the correction function $f_t(tc_i)$ can comprise any number of defined functional forms as determined proper for a particular situation. In one embodiment, the desired functional form may appear as illustrated in FIG. 5B which is further represented by the equation:

$$f_t(tc_i) = 1 - \frac{\alpha_t}{\beta_t + tc_i} \quad tc_i = 0, 1, 2, \ldots$$

where the following boundary conditions for this equation are:

$$f_t(0) = f_t^0$$
$$\frac{df_t(tc_i)}{dtc_i}(tc_i = 0) = \text{Tan}\left(\frac{\pi}{2}\zeta_t\right)$$

where $f_t^0$ and $\zeta_t$ are pre-specified values which range between (0,1), where these values must be greater than zero and less than 1. $f_t^0$ represents the starting point of the function (i.e. the base minimum probability for time cut zero for a fingerprint to be valid) and $\zeta_1$ represents the rate of growth of the function. Applying the boundary conditions and solving for the two constants $(\alpha_t, \beta_t)$ obtains:

$$\beta_t = \frac{1 - f_t^0}{\text{Tan}\left(\frac{\pi}{2}\zeta_t\right)}$$
$$\alpha_t = \beta_t(1 - f_t^0)$$

Correction Function $f_s(tc_i)$

In one aspect, the functional form for this correction factor is exactly the same as that of $f_t(tc_i)$, thus:

$$f_s(tc_i) = 1 - \frac{\alpha_s}{\beta_s + N_s}$$

$$N_s = 0, 1, 2, \ldots$$

$$\beta_s = \frac{1 - f_s^0}{\text{Tan}\left(\frac{\pi}{2}\zeta_s\right)}$$

$$\alpha_s = \beta_s(1 - f_s^0)$$

where $N_s$ is the number of symptoms indicating a problem P at $tc_i$. Looking back at the main equation for probability determination:

$$f_{total}(P,tc_i) = (f_r(P,tc_i)f_w(W_T) - f_t(tc_i))f_s(tc_i) + c$$

From these, it can be seen that certain conditions exist with similar boundary conditions. In one aspect, it can be seen that the minimum value for $f_{Total}(P, tc_i)_{min}$ is zero and the maximum value is one. Thus, the minimum and maximum values for the probability determination can be expressed as:

$$f_{total}(P,tc_i)_{min} = (f_r(P,tc_i)_{min}f_w(W_T)_{min} - f_t(tc_i)_{max})f_s(tc_i)_{min} + c$$

$$f_{total}(P,tc_i)_{max} = (f_r(P,tc_i)_{max}f_w(W_T)_{max} - f_t(tc_i)_{min})f_s(tc_i)_{max} + c$$

It should be noted that minimum and maximum values for the various correlation functions can be described as:

$$f_r(P, tc_i) = [0, 1]$$

$$f_w(W_T) = [0, 1]$$

$$f_t(tc_i) = \left[1 - \frac{\alpha_t}{\beta_t}, 1\right]$$

$$f_s(tc_i) = \left[1 - \frac{\alpha_s}{\beta_s}, 1\right]$$

Where substituting each of the above minimum and maximum values into the equations defined above yields the results:

$$c = f_t^0 = f_s^0 = f^0$$

Multi-Time Cut Probability Determination

In another embodiment, the fingerprint matching process will examine probabilities across multiple time cuts to determine whether a collective number of time cuts together satisfy some criteria indicating that a problem fingerprint event is being detected. The multiple time cut probability determination is invoked in the situation where the probability for any single time cut $f_{Total}(P, tc_i)$ does not meet the minimum probability threshold level $f_{min}$ to generate a problem fingerprint alert but the probabilities for a multiple number of time cuts each exceed another specified threshold, which can also be an indicator of a fingerprint event. While it is understood that other embodiments could select non-adjacent time cuts in the multiple time cut probability determination, the multiple time cuts are preferably selected as adjacent time cuts to indicate a trend or continuity of events in the system having a probability of leading to a problem. Since the multiple time cut probability determination is examining events that occur in multiple time cuts, the probability required to indicate a problem fingerprint over multiple time cuts preferably utilizes a different multiple time cut probability threshold $P_M$ that is lower than the single time minimum probability threshold level $f_{min}$. The multiple time cut probability threshold $P_M$ may be selected to be a fixed value or may alternatively vary with respect to the number of consecutive time cuts. In one aspect, the multiple time cut probability threshold $P_M$ decreases as the number of consecutive time cuts indicating some probability increases. In other words, the larger the number of consecutive time cuts containing some probability of a problem existing, the smaller the threshold value required to indicate a problem fingerprint. Conversely, when consecutive time cuts possess larger probability values, fewer numbers of consecutive time cuts with such probabilities are required to indicate a problem fingerprint.

By way of example, the minimum probability threshold level $f_{min}$ required to generate a problem fingerprint alert for a single time cut may be selected for a particular situation to be 0.75. If the probabilities for the monitored time cuts $f_{Total}(P, tc_i)$ are continuously generating probabilities between 0.4-0.6, then any single time cut will not reach the minimum probability threshold level $f_{min}$ sufficient to generate a problem fingerprint alert. However, the fact that continual probabilities between 0.4-0.6 are being reported during consecutive time cuts indicates that the monitored system is not operating ideally. Thus, a different multiple time cut probability threshold $P_M$ can be selected, such as a value of $P_M$=0.3. When a certain number of consecutive time cuts possess a probability $f_{Total}(P, tc_i)$ above the multiple time cut probability threshold $P_M$ (e.g., 0.3 in this example), then the multiple time cut probability determination will generate a problem fingerprint alert even though the minimum probability threshold level $f_{min}$ for any single time cut was never reached.

Figure 6:
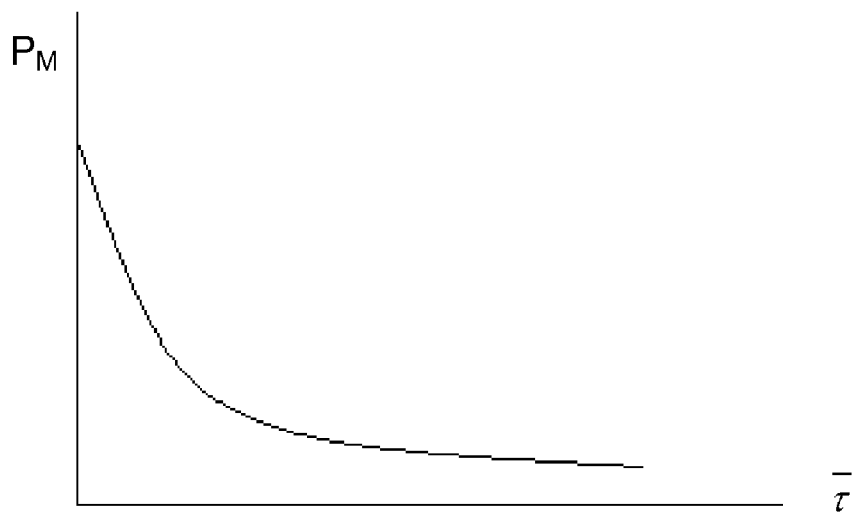
FIG. 6 is a representative graphical illustration of the multiple time cut probability threshold $P_M$ in accordance with one embodiment of the present disclosure.

One embodiment of the form for the multiple time cut probability threshold $P_M$ can be represented in the graphical illustration shown in FIG. 6 according to the following equation:

$$P_M(\bar{\tau}) = \frac{a}{e^{b\bar{\tau}}}$$

Where:
$\tau$=number of sequential time cuts for problem determination $(2, 3, \ldots, t_N)$
$\bar{\tau} = \tau - 2$
$P_M(\bar{\tau})$=probability threshold above which a fingerprint is indicated when $\tau$ adjacent time cuts exceeds its value And the boundary conditions are:

$$P_M(0) = P_M^0$$

$$\frac{dP_M(0)}{d\bar{\tau}}(0) = -\text{Tan}\left(\frac{\pi}{2}\zeta_M\right)$$

Such that the first and second boundary conditions lead to:

$$a = P_M^0$$

$$\frac{dP_M}{d\bar{\tau}} = -\frac{bP_M^0}{e^{b\bar{\tau}}} \rightarrow b = \frac{\text{Tan}\left(\frac{\pi}{2}\zeta_M\right)}{P_M^0}$$

Where $P_M^0$ is the minimum probability for two adjacent time cuts to indicate a fingerprint ($\bar{\tau}$=0) and $\zeta_M$ is the rate of decay of the function. This indicates that the value $P_M(\bar{\tau})$ required to indicate a problem gets smaller as the number of adjacent time cuts with probabilities that exceed $P_M(\bar{\tau})$ increases.

In one aspect, to determine whether a fingerprint is indicated through multiple time cuts, a matrix [M] is constructed which contains the information of whether the probabilities at a particular time cut exceeded $P_M(\bar{\tau})$. For example, the matrix [M] may appear as:

$$M = \begin{pmatrix} tc_i = 0 & 1 & 2 & 3 & 4 & 5 \\ \bar{\tau} = 0 & 0 & 1 & 0 & 0 & 0 & 0 \\ \bar{\tau} = 1 & 1 & 0 & 1 & 1 & 1 & 0 \\ \bar{\tau} = 2 & 1 & 1 & 1 & 0 & 0 & 1 \\ \bar{\tau} = 3 & 0 & 1 & 1 & 0 & 1 & 1 \\ \bar{\tau} = 4 & 0 & 1 & 1 & 1 & 1 & 1 \end{pmatrix}$$

Where the rows are indexed by $\bar{\tau}$ and the columns are indexed by the time cuts $tc_i$. A "1" in the matrix indicates that at the given time cut $tc_i$ and $\bar{\tau}$, the probability $f_{Total}(P, tc_i) > P_M(\bar{\tau})$, otherwise a "0" is inserted into the matrix. Note that since:

$$tc_i = (0, 1, \ldots, t_N-1)$$

$$\bar{\tau} = (0, 1, \ldots, t_N-2)$$

then [M] is an $(t_N-1) \times (t_N)$ matrix. To determine if a fingerprint is indicated for a given $\bar{\tau}$, the values of the matrix for that row are analyzed and if the sum of $\tau = \bar{\tau}+2$ consecutive columns equals $\tau$ then a fingerprint is indicated. The time cut for that fingerprint will be the smallest $tc_i$ of the summed group. As an example, for $\bar{\tau}=1$, three consecutive columns are required to have a value of 1. From the above matrix example, this condition occurs for $tc_i=2, 3, 4$, thereby indicating a fingerprint at time cut 2.

In one aspect, to determine the probability of a fingerprint in a multiple time cut probability determination, the average deviation of the difference between the computed time cut probability $f_{Total}(P, tc_i)$ and $P_M(\bar{\tau})$ is used as a reference. This is defined as:

$$\Delta \equiv \frac{1}{\tau} \sum_{i=1}^{\tau} \frac{f_{total}(P, tc_i) - P_M(\bar{\tau})}{1 - P_M(\bar{\tau})}$$

Figure 7:
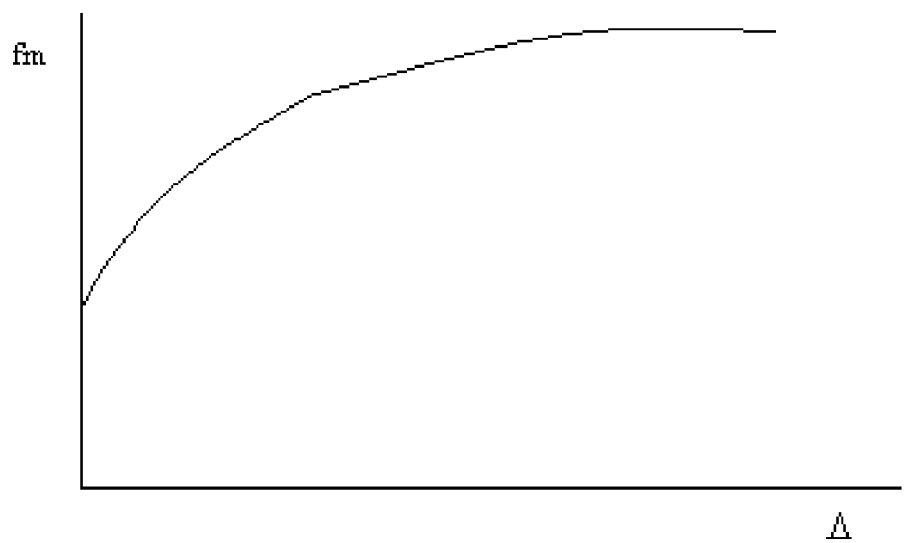
FIG. 7 is a representative graphical illustration relating to the probability of indicating a problem in a multi-time cut scenario in accordance with one embodiment of the present disclosure.

$\Delta$ represents the average fractional deviation of the various time cuts within a group of $\tau$ adjacent time cuts, from the theoretical maximum deviation of $1-P_M(\bar{\tau})$. $\Delta$ ranges from (0,1). One embodiment of a desired form of the probability represented by the equation is illustrated by the graphical illustration in FIG. 7.

The boundary conditions for the multi-time cut probability are:

$$f_{Multi}(P, \Delta) = f_{Multi}^0 \quad \text{when } \Delta = 0$$

$$f_{Multi}(P, \Delta) = 1 \quad \text{when } \Delta = 1$$

$$\frac{d f_{Multi}(P, \Delta)}{d\Delta} = 0 \quad \text{when } \Delta = 1$$

where $f_{Multi}(P,\Delta)$ is the probability of indicating a problem P in a multi time cut scenario and $f_{Multi}^0$ represents the minimal probability on indicating a fingerprint for the condition that $f_{Total}(P, tc_i) = P_M(\bar{\tau})$. Through the use of an equation of the form:

$$f_{Multi}(P,\Delta) = a\Delta^2 + b\Delta + c$$

and applying boundary conditions, the probability of indicating a problem P in a multi time cut scenario $f_{Multi}(P,\Delta)$ is:

$$f_{Multi}(P,\Delta) = (f_{Multi}^0 - 1)\Delta^2 + 2(1 - f_{Multi}^0)\Delta = f_{Multi}^0$$

Where if $f_{Multi}(P,\Delta) > f_{min-Multi}$, then a problem fingerprint alert is generated.

In various embodiments, the system and method for generating and using fingerprints for integrity management is operational in an IT infrastructure or with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The system and method for generating and using fingerprints for integrity management may be described in the general context of computer-executable instructions, such as program modules, being executed by a computer. Generally, program modules include routines, programs, objects, components, data structures, etc. that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices. The computer programs are stored in a memory medium or storage medium or they may be provided to a processing unit through a network or I/O bus.

In one aspect, the present system for integrity management includes at least one central processing unit (CPU) or processor. The CPU can be coupled to a memory, ROM or computer readable media containing the computer-executable instructions for generating and using fingerprints for integrity management. Computer readable media can be any available media that can be accessed by the system and includes both volatile and nonvolatile media, removable and non-removable media implemented in any method or technology for storage of information such as computer readable instructions, data structures, program modules or other data. Computer storage media includes, but is not limited to, RAM, ROM, EEPROM, flash memory, portable memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the fingerprint generation and matching systems. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of any of the above should also be included within the scope of computer readable media. The computer readable media may store instructions and/or data which implement all or part of the system described herein.

In one embodiment, the system and method for generating and using fingerprints for integrity management can be incorporated within J2EE and .NET based application that can be installed in any server environment, such a Windows or Linux server. In one aspect, the present system and method can act as an agentless system where no additional software is required to be installed on the monitored devices. Instead, the present system and method may collect relevant data and perform various system availability and performance tests by sending messages to the monitored systems in the form of ICMP pings, TCP/IP messages, commands over SSH terminal sessions, via Windows Management Instrumentation (WMI) methods and other known communication methods with devices in an IT infrastructure.

Many of the embodiments described herein will be directed toward integrity management of an IT infrastructure. However, it is the intention of the present inventors that the present system and method of generating and using a fingerprint can be extended to other types of systems and models.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
   accessing a fingerprint comprising a set of rules that describe the behavior of at least one metric of an information technology (IT) infrastructure, wherein at least one rule of the fingerprint describes the probability of a symptom for a specific time cut that corresponds to a number of time units prior to an occurrence of a problem, wherein the fingerprint is produced as a result of the problem in the IT infrastructure being identified, information related to the problem in the IT infrastructure being collected, and the set of rules being formed from the collected information;
   comparing the fingerprint to an incoming data stream; and
   preemptively predicting a potential problem in the IT infrastructure based on the fingerprint comparison;
   wherein at least one of the accessing, the comparing and the preemptively predicting is executed by a processor.

2. The method of claim 1, wherein at least a portion of the fingerprint comparison is performed using a statistical event-based correlation.

3. The method of claim 1, wherein the fingerprint is produced as a result of the collected information being analyzed to determine if fingerprint creation criteria are satisfied, the fingerprint creation criteria comprising an intermediate set of rules to determine if the collected information meets a threshold number of rules for fingerprint capture, and the fingerprint being captured or an existing fingerprint being updated using the set of rules.

4. The method of claim 1, wherein the fingerprint is device and time independent.

5. The method of claim 4, further comprising applying the device independent fingerprint to transactions occurring in the IT infrastructure.

6. The method of claim 4, wherein the fingerprint represents the operation of at least a portion of the IT infrastructure preceding the occurrence of the problem.

7. The method of claim 1, wherein the incoming data stream is substantially real-time data.

8. A non-transitory machine-readable medium having program instructions stored thereon executable by a processing unit for:
   accessing a fingerprint comprising a set of rules that describe the behavior of at least one metric of an information technology (IT) infrastructure, wherein at least one rule of the fingerprint describes the probability of a symptom for a specific time cut that corresponds to a number of time units prior to an occurrence of a problem, wherein the fingerprint is produced as a result of the problem in the IT infrastructure being identified, information related to the problem in the IT infrastructure being collected, and the set of rules being formed from the collected information;
   comparing the fingerprint to an incoming data stream; and
   preemptively predicting a potential problem in the IT infrastructure based on the fingerprint comparison;
   wherein at least one of the accessing, the comparing and the preemptively predicting is executed by a processor.

9. The non-transitory machine-readable medium of claim 8, wherein the fingerprint is produced as a result of the collected information being analyzed to determine if fingerprint creation criteria are satisfied, the fingerprint creation criteria comprising an intermediate set of rules to determine if the collected information meets a threshold number of rules for fingerprint capture, and the fingerprint being captured or an existing fingerprint being updated using the set of rules.

10. The non-transitory machine-readable medium of claim 9, wherein the fingerprint represents the operation of at least a portion of the IT infrastructure preceding the occurrence of the problem.

11. The non-transitory machine-readable medium of claim 8, wherein the fingerprint is device and time independent, the medium further comprising program instructions stored thereon for applying the device independent fingerprint to transactions occurring in the IT infrastructure.

12. The non-transitory machine-readable medium of claim 8, wherein the incoming data stream is substantially real-time data.

13. A system comprising:
   a storage device for storing a fingerprint comprising a set of rules that describe the behavior of at least a portion of an IT infrastructure, wherein at least one rule of the fingerprint describes the probability of a symptom for a specific time cut that corresponds to a number of time units prior to an occurrence of a problem, wherein the fingerprint is produced as a result of the problem in the IT infrastructure being identified, information related to the problem in the IT infrastructure being collected, and the set of rules being formed from the collected information;
   a fingerprint comparison module for comparing the fingerprint to an incoming data stream;
   a problem prediction module for preemptively predicting a potential problem in the IT infrastructure based on the fingerprint comparison; and
   a processor configured to execute an operation of at least one of the fingerprint comparison module and the problem prediction module.

14. The system of claim 13, wherein the fingerprint comparison module performs at least a portion of the fingerprint comparison using a statistical event-based correlation.

15. The system of claim 13, wherein the fingerprint is produced as a result of the collected information being analyzed to determine if fingerprint creation criteria are satisfied, the fingerprint creation criteria comprising an intermediate set of rules to determine if the collected information meets a threshold number of rules for fingerprint capture, and the fingerprint being captured or an existing fingerprint being updated using the set of rules.

16. The system of claim 13, wherein the fingerprint is device and time independent, further wherein the fingerprint comparison module applies the device independent fingerprint to transactions occurring in the IT infrastructure.

17. The system of claim 13, wherein the fingerprint represents the operation of at least a portion of the IT infrastructure immediately preceding the occurrence of the problem.

18. The system of claim 13, wherein the incoming data stream is substantially real-time data.

* * * * *